(12) United States Patent
Tang et al.

(10) Patent No.: US 11,171,782 B2
(45) Date of Patent: Nov. 9, 2021

(54) IDENTITY AND ELECTRONIC SIGNATURE VERIFICATION IN BLOCKCHAIN

(71) Applicant: Capital One Services, LLC, McLean, VA (US)

(72) Inventors: Qiaochu Tang, The Colony, TX (US); Geoffrey Dagley, McKinney, TX (US); Stephen Wylie, Carrollton, TX (US); Micah Price, Plano, TX (US); Jason Hoover, Grapevine, TX (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 140 days.

(21) Appl. No.: 16/541,446

(22) Filed: Aug. 15, 2019

(65) Prior Publication Data
US 2020/0280444 A1 Sep. 3, 2020

Related U.S. Application Data

(63) Continuation of application No. 16/290,673, filed on Mar. 1, 2019, now Pat. No. 10,425,230.

(51) Int. Cl.
*H04L 9/32* (2006.01)
*H04L 9/08* (2006.01)

(52) U.S. Cl.
CPC .......... *H04L 9/3213* (2013.01); *H04L 9/0894* (2013.01); *H04L 9/3239* (2013.01);
(Continued)

(58) Field of Classification Search
CPC ... H04L 9/3213; H04L 9/0894; H04L 9/3239; H04L 9/3247; H04L 2209/38; H04L 2209/56
(Continued)

(56) References Cited

U.S. PATENT DOCUMENTS 9,544,149 B2 * 1/2017 Follis .................... H04L 9/3247
9,635,000 B1 * 4/2017 Muftic ................... H04L 9/3239
(Continued)

OTHER PUBLICATIONS

Bernstein, J., "Smart Contract Integration in Professional Sports Management: The Imminence of Athlete Representation", DePaul University Journal of Sports Law, 14(5):87-105 (2018).
(Continued)

*Primary Examiner* — Shahriar Zarrineh
(74) *Attorney, Agent, or Firm* — Kacvinsky Daisak Bluni PLLC

(57) ABSTRACT

Disclosed are a system and techniques for identity and electronic signature verification that utilizes blockchain technology. An enterprise system enables computing devices to engage the enterprise and prospective users for the purposes of executing a document or a smart contract. Users may obtain a computer application from an enterprise system and may utilize the computer application to retrieve a document or select a smart contract. The identity of all users who execute the document may be verified based on an authentication by a trusted independent system. Information related to the respective signers, the document or smart contract, and the authentication may be stored as transactions in a blockchain. The transactions may be stored in the blockchain under a user's address, a document or smart contract address, or a digital wallet, if available.

17 Claims, 8 Drawing Sheets

(52) U.S. Cl.
 CPC ........ *H04L 9/3247* (2013.01); *H04L 2209/38* (2013.01); *H04L 2209/56* (2013.01)

(58) Field of Classification Search
 USPC .......................................................... 713/176
 See application file for complete search history.

(56) References Cited

U.S. PATENT DOCUMENTS

| | | | | |
|---|---|---|---|---|
| 10,432,402 | B1* | 10/2019 | Griffin | H04L 9/30 |
| 10,637,665 | B1* | 4/2020 | Sundaresan | G06Q 20/4012 |
| 2016/0260171 | A1 | 9/2016 | Ford et al. | |
| 2017/0206603 | A1* | 7/2017 | Al-Masoud | G06Q 40/06 |
| 2017/0220998 | A1 | 8/2017 | Horn et al. | |
| 2018/0018723 | A1* | 1/2018 | Nagla | H04L 63/08 |
| 2018/0075527 | A1* | 3/2018 | Nagla | G06Q 40/025 |
| 2018/0083951 | A1* | 3/2018 | Cicchitto | G06F 21/32 |
| 2018/0089758 | A1 | 3/2018 | Stradling et al. | |
| 2018/0117446 | A1* | 5/2018 | Tran | A42B 3/0433 |
| 2018/0144298 | A1* | 5/2018 | Rankin | H04L 9/34 |
| 2018/0152297 | A1* | 5/2018 | Fielding | H04L 9/3297 |
| 2018/0176017 | A1* | 6/2018 | Rodriguez | H04L 63/0861 |
| 2018/0218456 | A1* | 8/2018 | Kolb | G06Q 30/08 |
| 2018/0227116 | A1 | 8/2018 | Chapman et al. | |
| 2018/0322491 | A1* | 11/2018 | Madisetti | G06Q 20/389 |
| 2019/0026847 | A1 | 1/2019 | Stencil, Jr. et al. | |
| 2019/0034402 | A1* | 1/2019 | Anderson | G06Q 50/18 |
| 2019/0034602 | A1* | 1/2019 | Votaw | G06Q 20/4016 |
| 2019/0164153 | A1* | 5/2019 | Agrawal | H04L 9/008 |
| 2019/0220831 | A1 | 7/2019 | Rangarajan et al. | |
| 2019/0325038 | A1* | 10/2019 | Finlow-Bates | G06F 16/162 |
| 2019/0370799 | A1* | 12/2019 | Vivas | H04L 9/0643 |
| 2019/0385172 | A1* | 12/2019 | Jayaram | G06Q 20/405 |
| 2019/0386833 | A1* | 12/2019 | Alger | H04L 9/3247 |
| 2020/0007316 | A1* | 1/2020 | Krishnamacharya | H04L 9/3239 |
| 2020/0042989 | A1* | 2/2020 | Ramadoss | G06Q 20/102 |
| 2020/0119905 | A1* | 4/2020 | Revankar | G06Q 20/38215 |
| 2020/0143469 | A1* | 5/2020 | Stewart | G06Q 20/10 |
| 2020/0184556 | A1* | 6/2020 | Celia | G06F 16/2379 |
| 2020/0279257 | A1* | 9/2020 | Cheng | G06Q 40/12 |
| 2020/0279328 | A1* | 9/2020 | Zhiri | G06Q 20/3676 |
| 2020/0302433 | A1* | 9/2020 | Green | G06Q 20/3676 |
| 2020/0349561 | A1* | 11/2020 | Kuchkovsky Jimenez | G06F 16/2365 |
| 2020/0380624 | A1* | 12/2020 | Turgman | G06Q 50/18 |
| 2021/0042851 | A1* | 2/2021 | Gupta | G06Q 50/01 |
| 2021/0201318 | A1* | 7/2021 | Wylie | H04L 9/0643 |

OTHER PUBLICATIONS

Stark, J., "Making Sense of Blockchain Contracts", [online] Coindesk [retrieved on Feb. 15, 2019]. Retrieved from Internet URL: https://www.coindesk.com/making-sense-smart-contracts.

Alharby, M., et al., "Blockchain-based Smart Contracts: A Systemtatic Mapping Study", Computer Science & Information Technology (CS & IT), pp. 125-140 (2017).

Luu, L., et al., "Making Smart Contracts Smarter", paper presented at 23rd Annual ACM Conference (CCS'16) Oct. 24-28, 2016, Vienna, Austria, pp. 254-269.

Saini, V., "ContractPedia: An Encyclopedia of 40+ Smart Contract Platforms", retrieved from Internet URL:https://hackernoon.com/contractpedia-an-encyclopedia-of-40-smart-contract-platforms-4867f66da1e5, retrieved on Jun. 13, 2019.

Author Unknown, "Etherparty Update Nov. 2017", retrieved from Internet URL:https://blog.etherparty.com/etherparty-update-for-november-2017-fba4279f95a4, retrieved on Jun. 13, 2019.

Rosie, A., "Smart Contracts: The Blockchain Technology That Will Replace Lawyers", retrieved from Internet URL: https://blockgeeks.com/guides/smart-contracts/, retrieved on Jun. 14, 2019.

Author Unknown, "Etherscan", retrieved from Internet URL:https://etherscan.io/address/0xa74476443119A942dE498590Fe1f2454d7D4aC0d#readContract, retrieved on Jun. 14, 2019.

Author Unknown, "Etherscan", retrieved from Internet URL:https://etherscan.io/address/0xa74476443119A942dE498590Fe1f2454d7D4aC0d#internaltx, retrieved on Jun. 14, 2019.

Zorov, V., "How are smart contracts stored on the Ethereum blockchain? Does a smart contract also have a public and a private key?", retrieved from Internet URL:https://www.quora.com/How-are-smart-contracts-stored-on-the-Ethereum-blockchain-Does-a-smart-contract-also-have-a-public-and-a-private-key, retrieved on Jun. 14, 2019.

\* cited by examiner

IDENTITY AND ELECTRONIC SIGNATURE VERIFICATION IN BLOCKCHAIN

RELATED APPLICATIONS

This application is a continuation of U.S. patent application Ser. No. 16/290,673, entitled "IDENTITY AND ELECTRONIC SIGNATURE VERIFICATION IN BLOCKCHAIN" filed on Mar. 1, 2019. The contents of the aforementioned application are incorporated herein by reference.

BACKGROUND

This application describes systems and techniques for providing electronic signatures that are verifiable as authentic signatures of the person with whom the electronic signature is associated. Presently, there are several different ways or systems to provide an electronic signature or authorizations, such as email and third-party signature verification applications, such as HelloSign® and DocuSign®. However, these available systems have drawbacks and limitations. For example, email-based document signature systems are susceptible to "e-mail hacking" that may compromise the security or integrity of the signed document. For example, someone who has hacked the email of a party to the document may sign the document in place of the actual person who was intended to sign the document.

Other third-party signature verification applications rely on a third-party to insure the security and integrity of signed documents. For example, users register their identities with an electronic signature company, generate contracts to sign, and sign those contracts. Electronic signature companies keep a record of the document and signatures that can be later retrieved to verify which documents were signed by whom.

Unfortunately, these electronic signature companies are also susceptible to potential hacking from external bad actors and to errors by persons who manage the electronic signature companies' systems.

Another drawback to earlier e-sign processes is that the earlier e-sign processes provide low transparency. Electronic signature companies are "trusted entities" but without a view to how the documents that are to be electronically signed are managed and maintained, users can not be certain of the integrity and substance of their documents. For example, if e-sign data is altered, it can be difficult to distinguish the original document from the forgery.

In addition, electronic signature services provided by the electronic signature companies can also be costly. Electronic signature companies are for-profit entities, and consumers pay a premium for the convenience of being able to electronically sign a document over what the absolute costs are for providing and managing an electronic signature service.

SUMMARY

Disclosed is an example of a method that includes steps of verifying, by a respective trusted independent system of one or more trusted independent systems, an identity of a first user asserting ownership of digital credentials. In response to receiving a respective endorsement token confirming ownership of the digital credentials by the first user from the respective trusted independent system, a document address may be generated via an electronic signature computer application being executed by a computer processor of a computing device of the first user. A document associated with the document address may be generated by the computing device for review by a user. The generated document may include a text and document execution requirements. An initial hash value of a document at the document address may be stored as an initial transaction in the blockchain associated with the document address. An authentication document hash value may be obtained by applying a hash function to the generated document. The authentication document hash may be stored as a subsequent transaction at the document address in the blockchain. The generated document and the document address containing the authentication document hash may be forwarded to a computing device of a second user for electronic execution of the document by the second user. In response to electronically executing the document via the computing device of the second user, an executed document hash value of a version of the generated document electronically executed by the second user may be generated. The executed document hash value may be stored as another subsequent transaction at the document address in the blockchain. An indication that the document has been electronically executed by the second user may be received via the electronic signature application.

Also disclosed is a system example that includes a memory, a smart contract repository and an electronic signature component. The memory may store programming code and electronic signature computer application code that are executable by a computing device. The smart contract repository may be operable to store smart contracts. Each smart contract in the smart contract repository may have contract attributes and settings. The electronic signature component may be coupled to the smart contract repository and the memory, and to an external data network via a connection to an enterprise network. The electronic signature component may be operable to receive a selection of a smart contract from the smart contract repository from an instance of an electronic signature application executing on a first user's computing device. The selected smart contract may include a document and a set of selected smart contract related contract attributes and settings. In response to receiving the selection of the smart contract, the selected smart contract may be delivered to a smart contract address associated with the selected smart contract in the blockchain. A document hash may be stored as another transaction in the blockchain. The document hash may authenticate that the document was generated by a verified first user associated with a first user's computing device.

An example of non-transitory computer-readable storage medium storing computer-readable program code executable by a processor is also disclosed. The non-transitory computer-readable storage medium storing computer-readable program code executable by a processor execution of the computer-readable program code may cause the processor to present a menu of smart contracts available from a smart contract repository. Each smart contract in the menu includes programming code. In response to a selection of a smart contract from the menu of smart contracts by a first user, the selected smart contract may be requested from the smart contract repository. The selected smart contract and the smart contract programming code may be received and stored in a memory. A document within the selected smart contract and an address of the smart contract in a blockchain may be generated. A document hash value may be produced from the generated document. The document hash value may be stored in the blockchain at the smart contract address. The generated document may be forwarded to a second user for review of the generated document. The document may be signed using a signature related to a digital address associated with an identity of the first user. The digital address associated with an identity of the first user may enable access to information confirming the identity of the first user. An execution hash value associated with the first user based on the signing of the document by the first user may be generated. The digital address associated with the identity of the first user, the document hash value and the execution hash value may be stored in the blockchain associated with the smart contract address. A second user's execution hash value indicating that the document was signed by the second user may be received from the second user. The second user's execution hash value may be stored in the blockchain associated with smart contract address. The smart contract may be marked as complete in the blockchain based on a contract complete value received from the smart contract. The contract complete value may be stored in the blockchain associated with the smart contract address.

DETAILED DESCRIPTION

Figure 1:
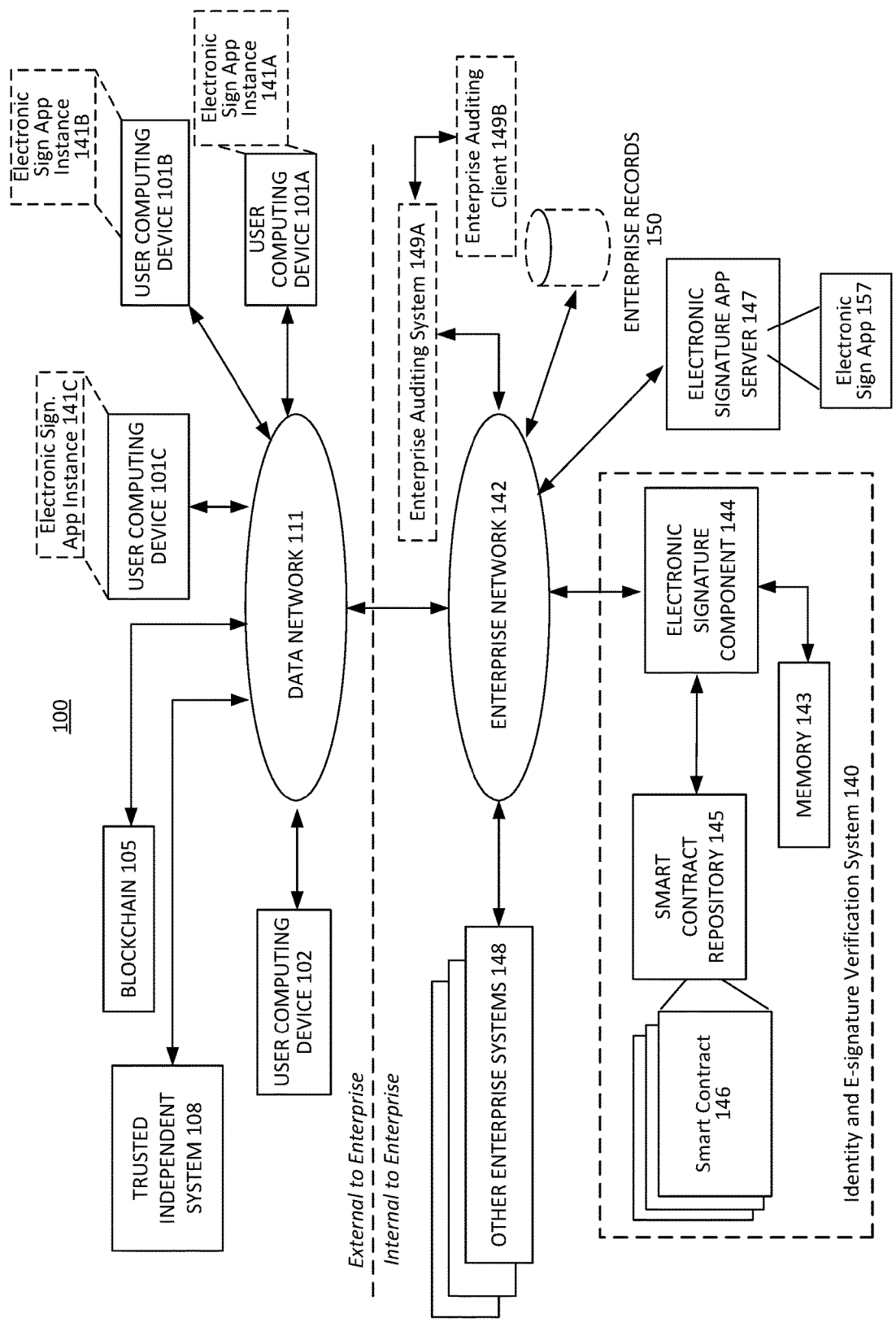
FIG. 1 shows an example of a system implementation suitable for implementing examples of a process that utilizes a blockchain.

There is a need for an e-sign system and techniques that provide security, document integrity and peace of mind in the e-sign process. The disclosed examples involve using blockchain for use in verifying and authenticating the identity and e-signatures of a digitally signed document. Improvements provided by the disclosed examples and apparent from the claims are the ease of completing a transaction, such as, for example, the steps involved in providing an auto loan and completing a car purchase. The described systems, methods and computer-readable media allow for audits of the transactions by including in the blockchain a capability for verification of the transactions in the blockchain and of the physical documents.

Blockchain technology and techniques may be used to mitigate problems with document security and document integrity by creating transactions in the blockchain application platform ("the blockchain") that are immutable and visible to all. It is extremely difficult for a bad actor to change a validated transaction in the blockchain. By storing a hash of a contract document on the blockchain, any party can later prove the legality of their copy without having to have expensive trusted third parties to store a copy of the contract. Moving the electronic signature process to the blockchain, as described with respect to the examples herein, also removes the need for a notary since an individual's verified electronic signature is recorded as a transaction in the blockchain. Once a document is signed with a verified electronic signature on the blockchain, any party with a copy of the contract can at any later point in time hash the document to derive the same document hash. This party can then find the address in the blockchain containing the signature of transactions and can show that the derived document hash matches the document hash stored at the address and verify that the contract was written and signed at the time that the block in the blockchain was generated. In addition, a blockchain solution also adds security and reduces costs as users only pay for the processing power needed to execute an electronic signature application and validate and store an electronic signature, a document, related information or the like.

The benefits of blockchain technology may be summarized in five basic principles of blockchain technology: 1) a distributed database, 2) peer-to-peer transmission, 3) transparency and anonymity, 4) irreversibility of records, and 5) computational logic. With a distributed database, each party on a blockchain has access to the entire database and its complete history. For example, no single party controls the data or the information. Every party can verify the records of its transaction partners directly, without an intermediary. Communication occurs directly between peers instead of through a central node. Each node stores and forwards information to all other nodes. In public blockchains, every transaction and its associated value are visible to anyone with access to the system. Each node, or user, on a public blockchain may, for example, have a unique 30-plus-character alphanumeric address that identifies it. Users can choose to remain anonymous or provide proof of their identity to others. Transactions occur between blockchain addresses. As for the irreversibility of records, once a transaction is entered in the blockchain, and the accounts are updated, the records cannot be altered, because the records are linked to every transaction record that came before them (hence the term "chain"). Various computational algorithms and approaches are deployed to ensure that the recording in the blockchain is permanent, chronologically ordered, and available to all others on the network. The digital nature of the ledger means that blockchain transactions can be tied to computational logic and programmed. As a result, users can set up algorithms and rules that automatically trigger transactions between nodes in the blockchain.

There are several different blockchain application platforms and protocols in use. As a way of comparison between the several different blockchain application platforms and protocols, the Ethereum blockchain application platform and the Hyperledger Fabric blockchain application platform are discussed in more detail. However, the disclosed examples should not be limited to these two specific blockchain application platforms since the examples and techniques described herein and referenced in the claims are intended to be implementable on any blockchain application platform.

The Ethereum blockchain application platform (referred to as "Ethereum") may, for example, provide features such as anonymity, full transparency, openness to the public, one single ledger, an extremely large network, security derived from network size, and all nodes (called "miners") in the blockchain are equal. In Ethereum, a block holds a fixed amount of data. Multiple transactions may be stored into a block until the block is filled. Once all nodes are filled in, the network compares blocks. Once a majority of nodes in the network agree on the contents of the block, the block is encrypted and linked ("chained") to another block in the existing blockchain. Ethereum may utilize digital wallets that are gateways to decentralized applications on the Ethereum blockchain that allow the digital wallet owner the ability to hold cryptocurrency built on Ethereum as well as write, deploy and use smart contracts. While Ethereum is a public blockchain, Ethereum may also be made private by using the open source code in a private network.

Conversely, Hyperledger Fabric is a private blockchain application platform (referred to herein as "Hyperledger") having features, such as named users, users need permission from other users to interact, closed to the public, multiple ledgers (e.g., multiple blockchains called channels in Hyperledger), a smaller network, a security derived from an access control list (ACL), three levels of nodes (e.g., endorser, peer and orderer nodes), complex, fast, low-cost, and honesty to protect reputation. For example, a transaction in a smart contract implemented in Hyperledger may have consensus, provenance (all recorded transactions are permanent), immutability (cryptographically linked), finality (single source of finality) and privacy.

As an example, a named user in Hyperledger may announce a transaction, and the transaction may be managed by a smart contract (that may utilize a "chaincode"). In some examples, a smart contract function is executed only by the selected endorser nodes. For example, endorser nodes agree on the result of the transaction/code execution prior to the transaction being added to the blockchain. Only the endorser nodes (or nodes granted permission presumably by all nodes in the transaction) may have access to the blockchain (or ledger), and since all parties agree to the content of data in the ledger the ledger does not need to be reconciled or audited by the respective parties to the smart contract. However, in cases where enterprise compliance or government regulations are involved, the ledger may be audited with permission of the parties by the enterprise or a governmental body to confirm, for example, regulatory or statutory compliance regarding information in the smart contract or document.

FIG. 1 shows an example of a system implementation suitable for implementing examples of a process that utilizes a blockchain. The networking environment 100 may include multiple different systems that are internal to an enterprise, such as an enterprise network 142, an identity and electronic signature (e-sign) verification system 140, an electronic signature application server 147, and other enterprise systems 148. In some examples, the enterprise network 142 may also be coupled to an enterprise auditing system 149A and enterprise auditing client 149B. In addition, the networking environment 100 may also include couplings via connections to elements external to the enterprise, such as a data network 111, user computing devices 101A, 101B, 101C and 102, blockchain 105 and the like. The data network 111 may be an external data network, such as the internet, another type of data network (e.g., a wide area network), a cellular network, or the like. The data network 111 may be coupled to many computing devices, such as user computing devices 101A, 101B,101C and 102 as well as blockchain 105 and trusted independent system 108. The data network 111 may communicate with the enterprise network 142 utilizing known security protocols. The trusted independent system 108 may be used to provide verification services and proof (in the form of electronic tokens) of user identities and other information that may be used to ensure the integrity of the smart contracts and documents.

The identity and E-signature verification system 140 may comprise systems with access to blockchain 105 via the enterprise network 142 and data network 111.

In more detail, the identity and e-sign verification system 140 may include a memory 143, a smart contract repository 145 and an electronic signature application (app) server 147. The memory 143 may store programming code for executing processes and functions, such as an example of a process described in more detail with FIG. 4 below. The smart contract repository 145 may store a smart contract 146. In an example, the smart contract repository 145 may include smart contracts having different classes of documents. For example, the different classes of documents may include mortgages, 30-year or 15-year, auto-loans for different terms, wills, trusts, child custody arrangements, bankruptcy documents, equipment leasing agreements, documents requiring any one of notarization, authentication or auditability, or the like. Each smart contract, such as smart contract 146, in the smart contract repository 145 may have contract attributes and settings, and electronic signature computer application code. The electronic signature computer application code and the programming code may be executed by a computing device, such as user computing devices 101A-C. The electronic signature application server 147 may be coupled to the enterprise network 142 with a connection to the data network 111, the smart contract repository and the memory 143.

The networking environment 100 can generate a non-reputable record of interactions via the blockchain 105. Furthermore, the blockchain 105 can be distributed across a plurality of computing systems, encouraging trust in the validity of the records stored in the blockchain 105. In this manner, the disclosed systems provide an innovative technical solution to at least the above-mentioned technical problems with conventional systems.

A user computing device, such as 101A-C may be operable to receive a request for selection of a smart contract from the smart contract repository 145, provide information to the identity and e-signature verification system 140, and perform other functions. In some embodiments, user computing device, such as 101A-C may be operable to receive the request from another element of the networking environment 100, such as another user computing device, such as 101A-C and/or a user computing device 102. A user computing device, such as 101A-C, may be operable to interact with blockchain 105 to process the request by storing a transaction or retrieving information in a transaction from the blockchain 105.

For example, user computing device, such as 101A-C may also be operable to store transactions in blockchain 105, consistent with disclosed examples. In some examples, user computing device, such as 101A-C may be operable to add blocks containing the transactions to blockchain 105. In various examples, user computing device, such as 101A-C may be operable to provide the transactions to an authorized system. In some examples, one or more user computing devices, such as user computing devices 101A-C may be authorized systems via the use of the electronic signature application instances 141A-C, respectively. The authorized systems 1-1A-C may be operable to add blocks containing the transactions to blockchain 105. As described with reference to the examples of FIGS. 2-6, the transactions may include document hash values, user identification documents hash values, user signatures hash values, smart contracts hash values or the like, contents of documents (if sufficient memory in a block of the blockchain 105), smart contracts (if sufficient memory in a block of the blockchain 105), metadata related to the transaction or the like.

In some examples, a user computing device, such as 101A, B or C, may include one or more computing devices, such as servers, workstations, desktop computers, or special-purpose computing devices. User computing device 101A, B or C may be standalone, or it may be part of a subsystem, which may be part of a larger system. For example, user computing device, such as 101B may be associated with a commercial institution.

Blockchain 105 may comprise a distributed data structure, consistent with disclosed examples. In some examples, the blockchain 105 may be a private blockchain. For example, authorized systems may store copies of blockchain 105. These authorized systems may be operable to add blocks to blockchain 105, validate the contents of blocks produced by other systems, publish the blocks to other authorized systems, and/or manage read/write permissions for other systems to blockchain 105. Authorized systems may be operable to receive transactions from other systems for publication in blockchain 105. These other systems may have read-only access to blockchain 105. As described below, blockchain 105 may be operable to store information as well as transactions from member systems as transactions to the blockchain 105, where the information or transactions in a transaction may include one or more of: a user's uploaded identifying documents (possibly encrypted), and/or a hash of those documents; an ownership document endorsement token (ODET) left by one or more trusted independent systems' servers; signatures on the document as people sign it; or metadata including, for example, who is supposed to sign the document (or smart contract) and when the document or the smart contract expires (e.g., how long the offer in the document or smart contract is open or an event that results in expiration).

Enterprise network 142 may be operable to provide communications between components internal to the enterprise of FIG. 1 and communicate with networks and devices external to the enterprise, such as data network 111, user computing devices 101A-C and 102, and blockchain 105. For example, network 142 may be any type of network (including infrastructure) that provides communications, exchanges information, and/or facilitates the exchange of information, such as a Local Area Network, a Wide Area Network, or other suitable connection(s) that enables identity and e-signature verification system 140 to send and receive information between the components of the enterprise.

In some examples, the networking environment 100 may include an enterprise auditing system 149A and enterprise auditing client 149 coupled to the enterprise network 142. The enterprise auditing system 149A and client 149B may be part of a larger internal enterprise system that audits whether the transactions in a smart contract comply with enterprise and governmental regulations. Furthermore, the smart contract may have sufficient programming code to perform the auditing functions. In addition, the enterprise auditing system 149A may also determine whether a selected smart contract obtained from the smart contract repository needs revision (e.g., additional data needed) based on updates to enterprise regulations, governmental regulations, or both. For example, the enterprise auditing system 149A may have an enterprise auditing client 149B that acts as a node in a blockchain platform to allow the auditing client 149B to check the blockchain. If another blockchain protocol which utilizes an application programming interface (API) calls is used, such as Hyperledger Fabric, an auditor node may be easily implemented according to known techniques. In another example, if the blockchain is public, the enterprise auditing system 149A via the enterprise auditing client 149B may be able to read the blockchain using a blockchain reader, such as blockexplorer.com or the like.

In an operational example, the electronic signature application server 147 may be operable to execute programming code, such as the programming code stored in the memory 143 to perform functions and provide services to the enterprise or enterprise customers. The electronic signature application server 147 may distribute instances of the electronic signature application 157 to computing devices that request the electronic signature application. The electronic signature application 157 may be a decentralized application downloaded by a user desiring to sign a document. The electronic signature application 157 may, for example, include programming code that enables generation of a unique address for the signer to use to sign multiple documents. The form of the unique address may be dependent upon the type of blockchain (e.g., Ethereum or Hyperledger) that is being used by the user. For example, the unique address generated by the electronic signature application 157 may be a digital address associated with information related to the user, a digital wallet associated with the user, or the like. A digital address may, for example, be a unique alphanumeric codename (e.g., 1CK6KY6MHgYvmRQ4PAaf-KDrglejbHcE, 1234Z5OX, or the like) of a user, a digital wallet or a document in a blockchain.

The electronic signature application server 147 may, for example, be operable to provide a copy (or instance) of the electronic signature computer application code 157 to a first user's computing device, such as user computing device 101A, in response to a request from the first user's computing device 101A. The request of the copy or instance of the electronic signature computer application code may be received via a connection (e.g., through a communication interface—not shown in this example) to the external data network 111 to the enterprise network 142. Upon receipt of the electronic signature computer application code, the code may be installed as an instance of electronic signature computer application (i.e., an electronic signature (Sign) application (App) instance) 141A. Similar requests may be made by user computing devices 101B and 101C, which may install instances of the electronic signature computer application code as a digital sign app instance 141B and a digital sign app instance 141C.

When a respective instance of an electronic signature application, such as 141A, 141B or 141C is installed on a respective one of user computing devices 101A-C, the respective instance of the digital sign app may communicate via the data network 111 and enterprise network 142 with the identity and e-signature verification system 140. For example, the electronic signature component 144 may receive from the instance of the electronic signature application instance, such as 141A executing on the first user's computing device 101A, a selection of a smart contract from the smart contract repository 145. In some examples, the selected smart contract may include a set of contract attributes and settings. Contract attributes of a smart contract may include the number of signers, required signers, signature pages, term, an expiration date or period, collateral, terms of default and repossession, annual percentage rate or monthly payment on an amount of money owed, options to allow a user to modify once or a set number of times the due date of the monthly payment, options to allow the user to transfer money owed from one month to the previous month or the following month in order to account for hardship budgetary circumstances, or the like, and the settings may include action to take upon expiration or completed execution, or failure of one party to execute the contract, where a copy of the final terms and conditions of the smart contract may be stored, a hash function or type of hash function to be applied to a final document, electronic signatures, an address where transactions are to be stored, or the like.

The operational example may include the electronic signature component 144 delivering the selected smart contract to a smart contract address associated with the selected smart contract in a blockchain, such as 105. The electronic signature component 144 may send to the electronic signature application instance 141A executing on the first user's computing device 101A, the selected smart contract address of the selected smart contract that is stored in the blockchain 105. In some examples, the blockchain 105 may be part of a larger blockchain platform. For example, if the blockchain 105 is part of a private blockchain platform (e.g., Hyperledger Fabric), information associated with the selected smart contract may only be accessible by the first user and any other users the first user authorizes and provides with the address of the selected smart contract. The first user may or may not encrypt the information. Conversely, if the blockchain 105 is part of a public blockchain platform (e.g., Ethereum), any user with the address of the selected smart contract may access the information in the smart contract. However, to ensure privacy, the document referenced by the hash stored in blockchain 105 may be encrypted, so access is limited to only the first user and any other authorized user having the encryption key.

In an example, the electronic signature component 144 may receive an address of the selected smart contract from the instance of the electronic signature application executing on user computing device 101A, which may be the first user's computing device. The instance of the electronic signature application instance 141A executing on the user computing device 101A may store a document hash as a transaction of the smart contract in the blockchain 105. The document hash may be used to authenticate that the document was generated by a verified user associated with the first user's computing device, in this example, 101A. Alternatively, or in addition, either one of the electronic signature applications 141A-C or the electronic signature component 144 may validate the integrity of the document address by evaluating the blockchain 105, which may be associated with the document address.

Once the identity of the first user is verified, the electronic signature component 144 may identify a final version of the document for electronic execution by the first user and the second user and generate a hash value of the identified final version of the document. In some examples, a copy of the identified final version of the document may be input into the selected smart contract. The smart contract may be forwarded to the second user for electronic signature. Alternatively, or in addition, the identified final version hash value may be maintained in the blockchain associated with the document address.

Continuing with the example, the instance 141A of electronic signature computer application code executing on user computing device 101A (which may be referred to as the first user's computing device) may generate a request to access the blockchain 105 or open the smart contract. When the blockchain 105 or smart contract is accessed or opened, the instance of the electronic signature computer application code 141A may present on a display device of the first user's computing device 101A, one or more indications of required signatures (e.g., the signatures that are required for execution), signatures not yet received, a required review and review substantiation, an order of signatures, or an order of required signatures dictated by settings in the smart contract.

In an additional example, the electronic signature application executing on the first user's computing device may receive another document associated with the document address for electronic execution by the first user. After electronically executing the other document by the first user, a hash value of the other document may be generated. The hash value of the other document may be stored in the blockchain associated with the document address. In addition, an electronic signature application executing on the first user's computing device may input into a smart contract, a version of the other document electronically executed by the first user, and the generated hash value of the other document electronically executed by the first user. Based on information in the smart contract or in response to an input from the first user, the electronic signature application executing on the first user's computing device may forward the smart contract to the second user for electronic execution via an electronic signature application executing on the second user's computing device of the other document.

In another example, the electronic signature component 144 may verify an identity of the user associated with the digital address as authentic using the obtained hash value and an identifier of the first user. In response to verifying the identity of the first user as authentic, the electronic signature component 144 may generate an ownership endorsement token associated with the digital address. In examples that utilize digital wallets, the electronic signature component 144 may forward the token for storage in the digital wallet associated with the first user.

In order to electronically sign the document, the individual signer (i.e., Second user) may send a request to an electronic signature application server, such as 147 of FIG. 1, for an instance of an electronic signature application. The electronic signature application server may deliver the instance of the electronic signature application that may be installed on the individual signer's computing device (e.g., Second user's computing device 301). The electronic signature application 157 may be a decentralized application downloaded by a user desiring to sign a document.

After receiving and installing the electronic signature application on their respective user computing device, each respective user may establish a respective verified identity, so others may reasonably rely upon the authenticity of the respective user's electronic signature on any documents or in transactions. The respective user's verified identity may be authenticated a trusted independent system that provides an authentication token. For example, the electronic signature component 144 may also perform functions such as user identity verification. It may be helpful to explain an example of a user identity verification process.

Figure 2:
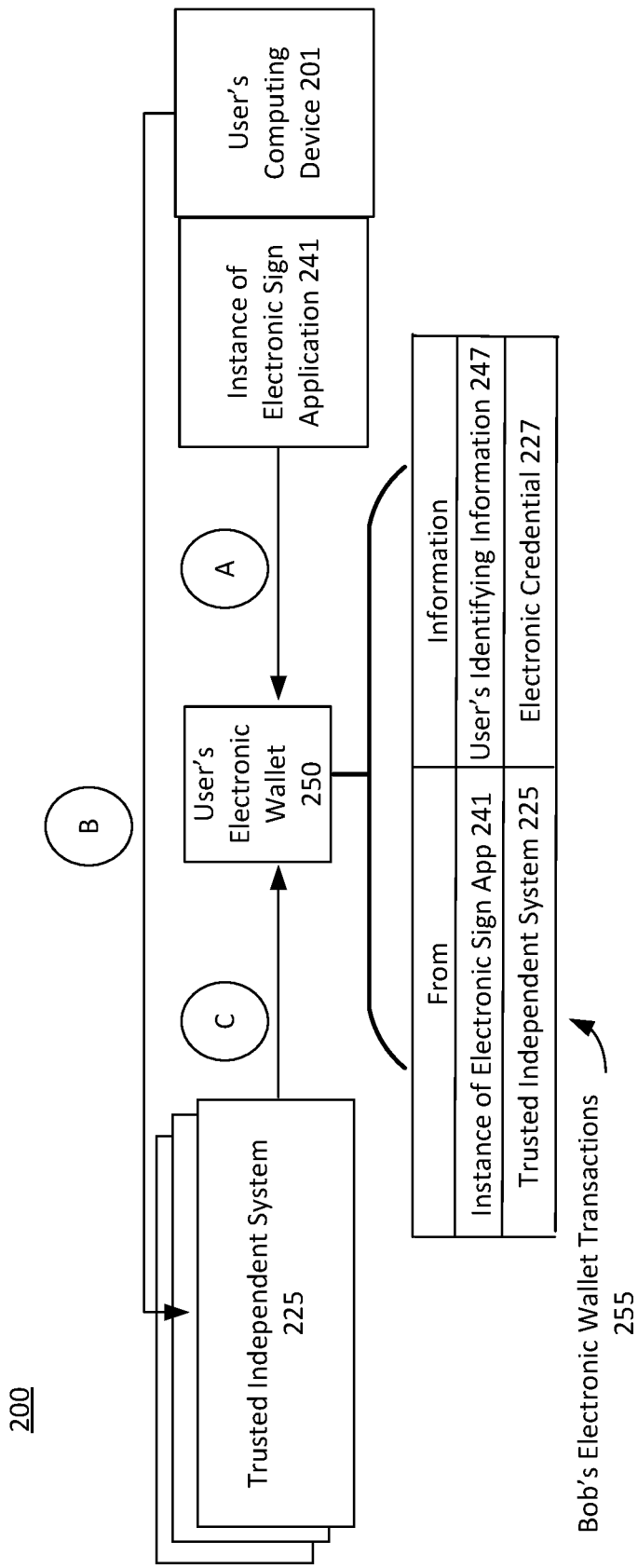
FIG. 2 provides a graphical example of a process flow for verifying an identity of a user that utilizes the system and processes consistent with the disclosed examples.

FIG. 2 provides an example of a process flow for verifying an identity of a user. The process flow of FIG. 2 may utilize some system components such as those shown in FIG. 1 as well as additional system components. For example, a verification process 200 may include receiving a request for verification of ownership of a digital credential from a user such as the user's computing device. The verification request may include an identifier of the user of the user computer device 201 and a digital address associated with the user. A hash value associated with the first user's digital address may be obtained from a blockchain via the connection to the external data network. The obtained hash value and the identifier of the user may be used to verify an identity of the user associated with the digital address as an authentic identity of the user. In response to the verification of the identity of the user as authentic, the trusted independent system 225 may generate an ownership endorsement token linked with the digital address associated to the first user. The trusted independent system 225 may forward the ownership endorsement token for storage in the digital wallet associated with the first user.

User information may be stored in data storage, such as memory 143 or enterprise records 150 of FIG. 1. In the example of FIG. 2, a respective computing device, such as user's computing device 201, that is executing an instance of electronic signature application 241 may receive information (i.e., user's personal information) that positively identifies the user of user's computing device 201 as the verified user.

For example, a trusted independent system 225 may receive a verification request for verification of ownership of a digital credential, such as user's wallet 250, from user's (e.g., a first user's) computing device 201. The user's wallet 250 may include several transactions 255. For example, user's wallet 250 may include the user's personal information received from the instance of the electronic signature application 241 executing on the user's computing device 201, and a verification token from the trusted independent system 225.

In the example, the instance of the digital sign application 241 executing on the user's computing device 201 creates, at A, a new wallet and adds the user's personal information. The electronic signature application 241 sends via the user's computing device 201 a request to the trusted independent system 225 for verification of the user's identity (at B). The request sent via the user's computing device 201 includes the user's personal information and the user's digital wallet 250, a copy of the user's digital wallet 250 or an address of the user's digital wallet 250. Upon receipt of the request, the trusted independent system 225 may use the user's personal information and whatever resources the trusted independent system 225 is able to access to verify that the personal information positively and uniquely identifies the user. In response to an authentication of the personal information as positively identifying the user, the trusted independent system 225 may generate a digital credential 227 that will be owned by the user. The digital credential may be an encrypted codeword, a hash value or a combination of information that uniquely and securely identifies the user.

In more detail, verification of the ownership of the digital credential 227 serves as authentication and verification of the identity of the first user. The verification request may include an identifier of the user of the user computer device (e.g., the first user using computing device 201) and second user's digital wallet or a digital address associated with the first user (at C). Information related to the first user included in the digital credential may be used to verify and authenticate the identity of the first user. Upon verification and authentication of the identity of the first user, the digital credential 227 may be stored at the digital address associated with the first user. The digital credential 227 may be, for example, a token (e.g., an ownership document endorsement token (ODET)) or another mechanism for positively identifying the user obtained from a trusted independent system 225. The digital credential 227 may be stored in the user's digital wallet 250 and be listed as a transaction in the user's wallet transactions 255. The instance of the electronic signature application 241 may store the user's personal information 247 in the user's digital wallet 255.

In an operational example, an electronic signature application executing on a user computing device may request that the user (i.e., signer) verify his or her identity through a trusted independent system. This verification, in this example, may involve using some version of a user authentication technique and application, such as OAuth, where the signer signs into a trusted independent system like an enterprise or other trusted entity and passes to the enterprise encrypted versions of the user's wallet address or other identifying information. The trusted independent system may decrypt and verify the user's information inside the wallet and send a transaction to the user's wallet confirming verification of the user's identity. At this point, the user's (i.e., signer's) identity is tied to the newly generated user wallet address.

A user whose signature may be needed on a contract may receive the contract. This contract may be created either by another entity, such as an enterprise that has registered on the blockchain in a similar manner or by a trusted public entity, such as a banking institution, a computer security company or the like. The signer and the contract drafter write the contract offline. When the contract is ready to be signed, a hash is taken of the contract document. This hash is used to generate a smart contract where the signing party wallets and hash are fed in as inputs. The signer then uses his or her signing application to digitally sign the contract hash. When all signatures are received for a document, the smart contract marks the document as signed and final.

While the foregoing discusses a document wallet, in some blockchains, a document address may be utilized instead of a document wallet. The document address may be a public identifier (also referred to as an address) or a cryptographical hash of the public identifier under which is a list of transactions associated with the document. Information related to the document, such as a document hash, document attributes, document requirements or the like, may be stored in the blockchain as separate transactions under the document address.

As a technique to improve security and reduce the amount of memory space consumed by the digital credentials 247, the digital sign application instance 241 may generate a hash of the digital credentials or other information for positively identifying the first user. The hash value may be usable to verify the identity of the first user. The hash value may be stored in the blockchain at a digital address associated with the first user. The electronic signature component 144 may obtain the hash value associated with the first user's digital address from the blockchain 105 via the connection to the external data network 111.

Figure 3:
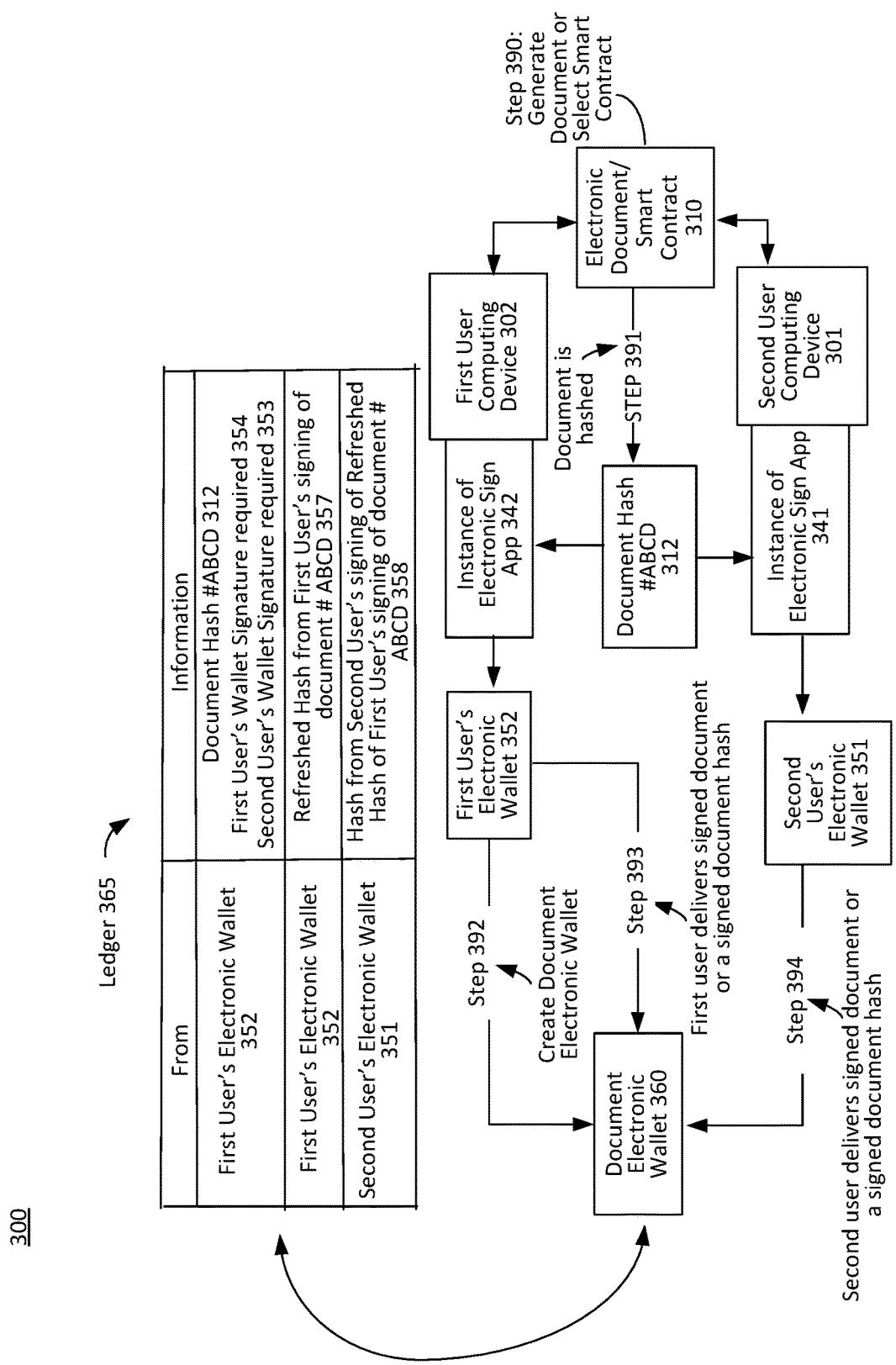
FIG. 3 provides a graphical example of a process flow for an electronic signature process of a user.

FIG. 3 provides an example of a process flow for an electronic signature process of a user. In another example of a process 300, a document or a smart contract 310 may be presented to a user (either to a first user via first user's computing device 302 or to a second user via second user's computing device 301), who is not an originator of the smart contract or document. Alternatively, the document or smart contract may be drafted (or written) and all parties may revise the document or smart contract until a final draft of the document or smart contract is approved by all parties. The second user's computing device 301 and first user's computing device 302 may be like the user computing devices 101A-C of FIG. 1. Both second user's computing device 301 and first user's computing device 302 may each have installed an instance of the electronic signature application, 341 and 342, respectively. In addition, the second user may have established second user's digital wallet 351 and first user may have established first user's digital wallet 352. Each of respective digital wallets 351 and 352 may be usable on a blockchain platform, and each signer (i.e., second user and first user) may send a transaction via his or her digital wallet to an address of a document or smart contract in the blockchain acknowledging (or signing) the document hash.

The respective digital wallets may store information that is usable to verify the identity of the owner of the digital wallet. For example, second user's digital wallet 351 may store information, such as an ownership document endorsement token (ODET) or the like, that may be used to identify second user and verify that the second user is, in fact, the second user. The ODET may be provided by a trusted independent system, such as another enterprise system 148 of FIG. 1 or trusted independent system 225. Similarly, first user's digital wallet 352 may store information usable to identify first user and verify that the first user is, in fact, the first user. The respective digital wallets (second user's digital wallet 351 and First user's digital wallet 352) may, for example, be desktop wallets, mobile wallets, hardware wallets or be web-based wallets, which each have their own respective security and user preferences.

In an example process, second user and first user may decide that they want to enter into a contract or want to sign a document that requires both their signatures (such as an assignment of their rights to a patent or the like). A document or smart contract may be generated (Step 390), such as digital document or smart contract 310. The document may be generated using word processing software and may be written in any language or format. The document may be revised by both second user and first user until both are satisfied with the terms and conditions in the document. After the document is completed, both second user and first user may agree that the document should be e-signed.

Once the contents of the document are agreed upon, a hash function, such as SHA-256 or the like, may be applied to the document (Step 391). A hash function is any function that can be used to map input data of arbitrary size to a hash value of a fixed size. The document hash may be applied to the document by the smart contract, an electronic signature application, such as 141A-C, or the like executing on a user device that generated the document. Alternatively, the document may be provided to another system, such as the identity and e-signature verification system 140, for application of the hash function. The other system may return the document and/or the hash value to the customer.

The hash of the document, such as document hash #ABCD 312, may be sent to an instance of an electronic signature application 341 executing on the second user's computing device 301 and to an instance of an electronic signature application 342 executing on the first user's computing device 302. In some instances, a digital wallet may be established for the document, such as document digital wallet 360. For example, the first user's computing device 302 may generate the document digital wallet 360 at step 392. The document digital wallet 360 may have an address in the blockchain platform. The document hash #ABCD 312 may be stored at the document address in the blockchain via programming code, such as that provided with a smart contract. Alternatively, or in addition, an instance of an electronic signature application, such as 341 or 342, may cause a respective digital wallet on the blockchain platform, such as the second user's digital wallet 351 or the first user's digital wallet 352, to store the document hash #ABCD 312.

Several transactions are shown in ledger 365, where the ledger has been simplified to show only transactions relevant to this document. The transactions may indicate who originated the transaction (i.e., FROM) and the information that is in the transaction. For example, the information may be simply a hash value (i.e., a hash) that represents the information that the user intended to upload to the blockchain. The hash and/or the information may be encrypted or unencrypted. In addition to the specific example transactions (e.g., 312, 353, 354, 357 and 358), there appear to be several transactions stored on the blockchain. For example, user's uploaded identifying documents (that may or may not be encrypted), and/or a hash (i.e., hash value) of those documents; one or more trusted third-party servers leaving an ownership document endorsement token (ODET); signatures on the document as user's sign the document; metadata including information such as who is supposed to sign it and when the contract offer expires. In addition, a transaction may be used to indicate that the document is completed. However, in some examples, such a transaction may be unnecessary because a properly implemented smart contract may keep track of who signed it when and may be operable to access smart contract internal properties or variables to return whether the document is completely signed.

As shown in the document wallet transactions 365, the first user's app 342 may initiate transactions that stored the document hash #ABCD 312 in the document digital wallet 360. In addition, the smart contract's wallet, which may be the same as the document wallet 360, may have stored transactions indicating that Second user's signature is wallet signature (required) 353 and First user's wallet signature (required) 354 are required on the document or document hash.

In an additional example, if the document was generated as part of a smart contract, the smart contract may generate notifications that may be stored in the document digital wallet 360. Alternatively, in a smart contract implementation, the smart contract 310 may have programming code that invokes an application program interface, such as, for example, a RESTful API in Ethereum, call to a service operable to push notifications to devices that subscribe to the service. The notification may state, for example, a document is ready for signature, another party has signed the document, another party has made a revision to the document or the like. In another example, a notification from the smart contract may be received by the instances of the electronic signature application 341 and 342 executing, respectively, on the second user's computing device 301 and the first user's computing device 302. In response to the received notification, the respective electronic signature application may, for example, generate transactions indicating that the respective parties to the smart contract or document, which in this case are the second user and the first user, received notification of additional actions such as a required signature. These transactions may be stored in the document digital wallet 360 as well as transactions in the respective parties' digital wallets (in this example, 351 and 352, respectively).

The first user's digital wallet 352 may be used in combination with the instance of the electronic signature application 342 executing on the first user's computing device 302. For example, in response to determining that the first user's wallet signature is required, the electronic signature application 342 via the first user's digital wallet 352 may generate commands to sign the document, sign a hash of the document (i.e., the document hash) or some other form of indicating by applying the first user's signature that the first user agrees to the terms of the document at step 393. In response to the first user signing the document hash #ABCD 312, a refreshed hash value is generated from the first user's signing of the document hash #ABCD 357 and is stored in the document digital wallet as a transaction in ledger 365 from the first user's digital wallet 352. When the second user signs the refreshed hash value of the first user's signing of the document hash #ABCD, another hash value is generated as the Hash from Second User's signing of Refreshed Hash of First User's signing of document # ABCD 358. The hash of the second user's signing of the document hash #ABCD 358 may be stored at 394 via the second user's digital wallet 351 in the ledger 365 of the document digital wallet 360. The generation of a new or refreshed hash value after each user signs the document or document hash prevents a subsequent user from submitting a signature on an old copy of the document.

In some examples, the results of each process step 390-394) results in a transaction being stored at one or more addresses in the blockchain, such as the document digital wallet 360, the second user's digital wallet 351, and/or the first user's digital wallet 352.

Signing may be performed according to various methods. For example, an electronic copy of a signed paper document may be received, and an electronic signature application, such as 341 and 341 may sign an electronic document or a document hash of the electronic document. In the case of the signed paper document, for example, the signatory may sign the paper document, upload an electronic copy of the signed paper document, and hash the uploaded electronic document. For example, a programming code within the instance of the electronic signature application may provide a service that enforces exactly where a signatory can physically write on the document to sign it and avoid inadvertently altering the document in an adverse way.

Alternatively, the instance of the electronic signature application may collect a signature from the signatory (e.g., the second user's signature or the first user's signature) and automatically apply it to the predetermined spot in an electronic copy of the document or apply its response to a user input confirming the document without a scribed signature. In such a case, the instance of the electronic signature application may generate a script-like text or other electronic signature method, such as "/Name Here/" on your behalf. For example, the electronic signature application may be operable to apply a function that may be applied to a smart contract. For example, when a signatory, such as the second user, has an address to a smart contract, the instance of the electronic signature application 341 executing on the second user's computing device 301 may run a function against the smart contract (e.g., a smart contract selected at 390) to sign it. Alternatively, in the event of a private blockchain, such as in Hyperledger Fabric, the signing function may be exposed as an application programming interface (API) call. For example, the instance of the electronic signature application 341 executing on the second user's computing device 301 may make the API call via input into a user interface (application or website with a selectable button) or the like.

In yet another alternative signature example, a user may take a hash of a (physically or electronically) signed document. The hash may be presented via the electronic signature application as an authentic representation of the signed document and indicate that the hash has been signed. In this example, the signed document hash would suffice as the signatory's signature on the document.

In still another alternative signature example, signatures may be stored into an array or a hash map that references users who have signed it. For example, a list may be stored in an array that includes digital wallet addresses of a signing user or other signing user identifier. The list may be included as a key when a new document hash is generated. In addition, metadata may also be used with the key. The metadata may, for example, include identification proof, such as an ODET, a timestamp, or the like. A predetermined list of identifiers may also be provided to prevent spoofing by random signers who sign in place of intended signers. In an alternate approach, the smart contract document may comprise an asset that originates in one wallet, such as the first user's digital wallet 352. Once all the required signatories sign the multi-party transaction, a transaction is initiated that would transfer it to another wallet, such as a "done" wallet (not shown in this example) that may be owned by a trusted third party or trusted independent system. In this alternate approach, the signatures may not be directly applied to the document, so the document hash doesn't change, but an instance of the electronic signature application may either apply some script-like text in lieu of people's names, (e.g., /people's names like this/) or have signatories put their signature upon the blockchain at another address so the signature may be used later. Upon completion of the multi-signature transaction, the signatures may be applied in the manner(s) previously described, and the final document is disseminated to all the signers.

Of course, the respective identities of the second user and the first user may need to be verified prior to documents being shared and executed. In an example, an individual signer, such as the second user, may receive via their respective computing device (e.g., the second user's computing device 301) a request for execution (via an electronic signature) of a document or smart contract from another user's computing device (e.g., the first user's computing device 302). In response to receiving the request for execution of the document or smart contract, the individual signer may upload from a computing device a starting transaction containing some personal information, such as name, residence address, electronic contact information, social security number, driver's license information or the like, in encrypted form to a wallet. The signer may upload a starting transaction containing some of the signer's personal information in encrypted form to their respective wallet (e.g., the first user's information to the first user's digital wallet 352 and the second user's information to the second user's digital wallet 351).

Figure 4:
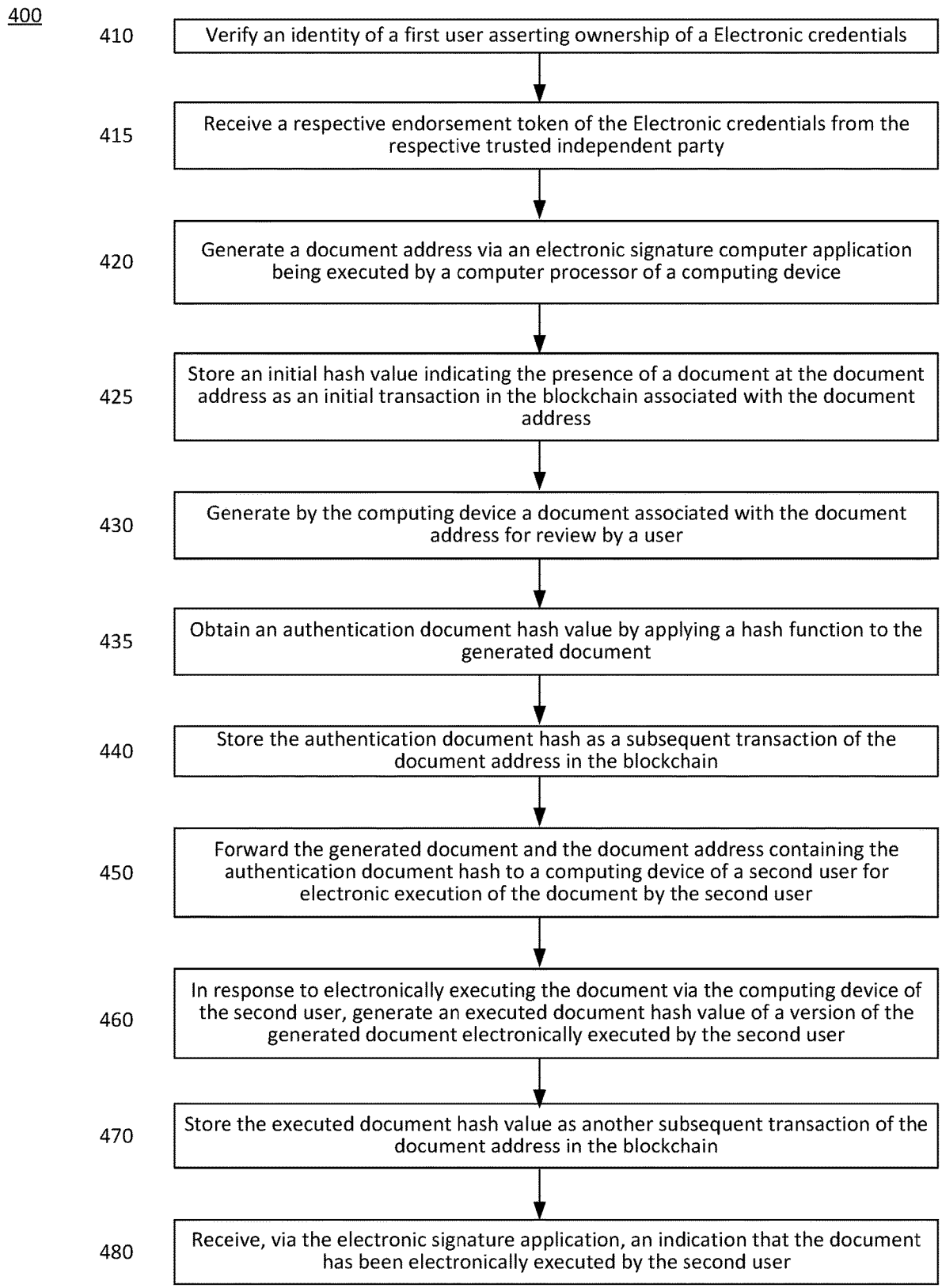
FIG. 4 illustrates an example of a process flow of a process of utilizing the verified user identity and electronic signature process with respect to an electronic document.

The flowchart of FIG. 4 depicts an example of a flow of a process 400 for utilizing the example of the verified user identity and an electronic signature component of FIG. 1.

At step 410, a respective trusted independent system of one or more trusted independent systems may verify an identity of a first user asserting ownership of a digital credential. In response to verification of an identity of the first user by the trusted independent system, a respective endorsement token of the digital credentials may be received from the respective independent system (415). In some examples, the respective endorsement token associated with the first user's digital credentials may be stored at an address in a blockchain.

A document address may be generated (420) via an electronic signature computer application being executed by a computer processor of a computing device. The document address may be generated in response to establishing first user ownership of the document address by uploading identifying information of the first user as digital credentials to the address in the blockchain associated with the first user. For example, a respective endorsement token of the digital credentials may be received from the respective trusted independent system in response to verification of an identity of the first user by the trusted independent system. The respective endorsement token associated with the first user's digital credentials may be stored at an address in a blockchain. In some examples, a hash function may be applied to the identifying information of the first user to produce an identifying information hash. The identifying information hash may be stored with the respective endorsement token associated with the first user's digital credential at the address of the first user.

In some examples, the electronic signature computer application may cause the computing device processor to generate a hash value related to the document. The electronic signature computer application may cause the processor to store an initial hash value indicating the presence of a document at the document address as an initial transaction in the blockchain associated with the document address (425).

At 430, the computing device may generate a document associated with the document address for review by a user. The generated document may include a textual document and document execution requirements. The textual document may be a contract or some other document that requires validation by obtaining signatures of parties named in the document (i.e., execution of the document). In an example, a smart contract may allow a document to be generated based on attributes of the smart contract. An attribute of the smart contract may, for example, be the generation of a document in response to the receipt of an endorsement token related to the smart contract. Regardless of when the document is generated, the generated document may be uploaded to a memory referred to as the document address or to the blockchain. In some examples, the document address can be created prior to the actual generation of the document.

After the document is generated, an authentication document hash value by applying a hash function to the generated document may be obtained from or by the electronic signature computer application (435). The authentication document hash may be stored as a subsequent transaction at the document address in the blockchain (440).

In addition, a final version of the document may be identified for electronic execution by the first and the second user. A hash value of the identified final version of the document may be generated, and the identified final version hash value may be maintained in the blockchain associated with the document address. In an example that utilizes a smart contract, a copy of the identified final version of the document inputting into the smart contract and the smart contract may be forwarded to the second user for electronic signature.

In an example, the generated document and the document address containing the authentication document hash may be forwarded to a computing device of a second user (450) for electronic execution of the document by the second user. The computing device of the second user may be a user device such as user computing device 101C of FIG. 1. The second user computing device may, for example, be installed with an electronic signature application instance, such as 141C of FIG. 1. At 460, in response to electronically executing the document via the computing device of the second user, an executed document hash value of a version of the generated document electronically executed by the second user may be generated.

In an example, the order of the signatures (i.e., who signs first and who signs second, and so on) may be enforced by confirming that the document being signed originated from the most recent hash of the document. For example, when a user's computing device uploads a new version of a document in which a signatory applied their signature (and thus changed the hash), the instance of the electronic signature application executing on the user's computing device may update previous document hashes by applying a hash function to the new version of the document. This latest hash (i.e., hash value) may be stored in the document wallet or the smart contract. Then, if a user tries to upload via a computing device their version of the signed document and the hash prior to them signing is the original hash and not the latest hash, then the smart contract or the instance of the electronic signature application knows to reject the newly uploaded document with the wrong hash since the newly uploaded document does not contain the latest signature as indicated by the latest hash.

The executed document hash value may be stored as another subsequent transaction at the document address in the blockchain (470). Via the electronic signature application executing on the second user's computing device, an indication that the document has been electronically executed by the second user may be received (480) by the first user or an enterprise associated with the document. For example, an indication may be a notification message generated by the electronic signature application, an email message or another type of message that indicates the second user electronically signed the document. In some examples, there may be a document repository, for example, in memory 143 of identity and e-signature verification system 140 of FIG. 1 or enterprise records 150. The document repository may, for example, be used throughout the process 400 (to store document state after each signature) or not at all if the blockchain has enough memory to store a significant amount of data.

The foregoing examples referred to a first user and a second user as signatories of a document or smart contract for ease of illustration and explanation. However, the examples as described herein may be extended to any number of signatories and are not limited to only a first user and a second user.

The process step 410 of verifying the identity of a first user or any user asserting ownership of digital credentials may include several subprocess steps that may be performed by an electronic signature component such as 144 of FIG. 1 or a trusted independent system 225 of FIG. 2. For example, the computer processor executing the electronic signature application may request submission of the digital credentials containing the first user's identifying information to one of the one or more trusted independent systems for verification of an identity of the first user. In response to the request for submission of the digital credentials containing the first user's identifying information, the first user's digital credentials may be sent to a respective trusted independent system of at least one of the one or more trusted independent systems used for verification of the identity of the first user. The trusted independent system may compare the first user's information in the first user's digital credentials to information obtained by the respective trusted independent system. Upon successful verification of the identity of the first user, the respective trusted independent system may store the endorsement token into the digital address associated with the first user in the blockchain. In addition, upon successful verification of the first user's identifying information by the respective trusted independent system of the one or more trusted independent systems, the respective endorsement token may be received from the respective trusted independent system.

In some examples, the digital address associated with the first user may be sent to another trusted independent system of the one or more trusted independent systems other than the respective trusted independent system for verification of the identity of the first user by the other trusted independent system. Upon successful verification of the identity of the first user by the other trusted independent system, another endorsement token may be received from the other trusted independent system to be stored at the digital address associated with the first user. In this example and others, the digital address associated with the first user is further associated with a blockchain containing respective hash values of the endorsement token received by the respective trusted independent system and the other endorsement token from the other trusted independent system.

Figure 5:
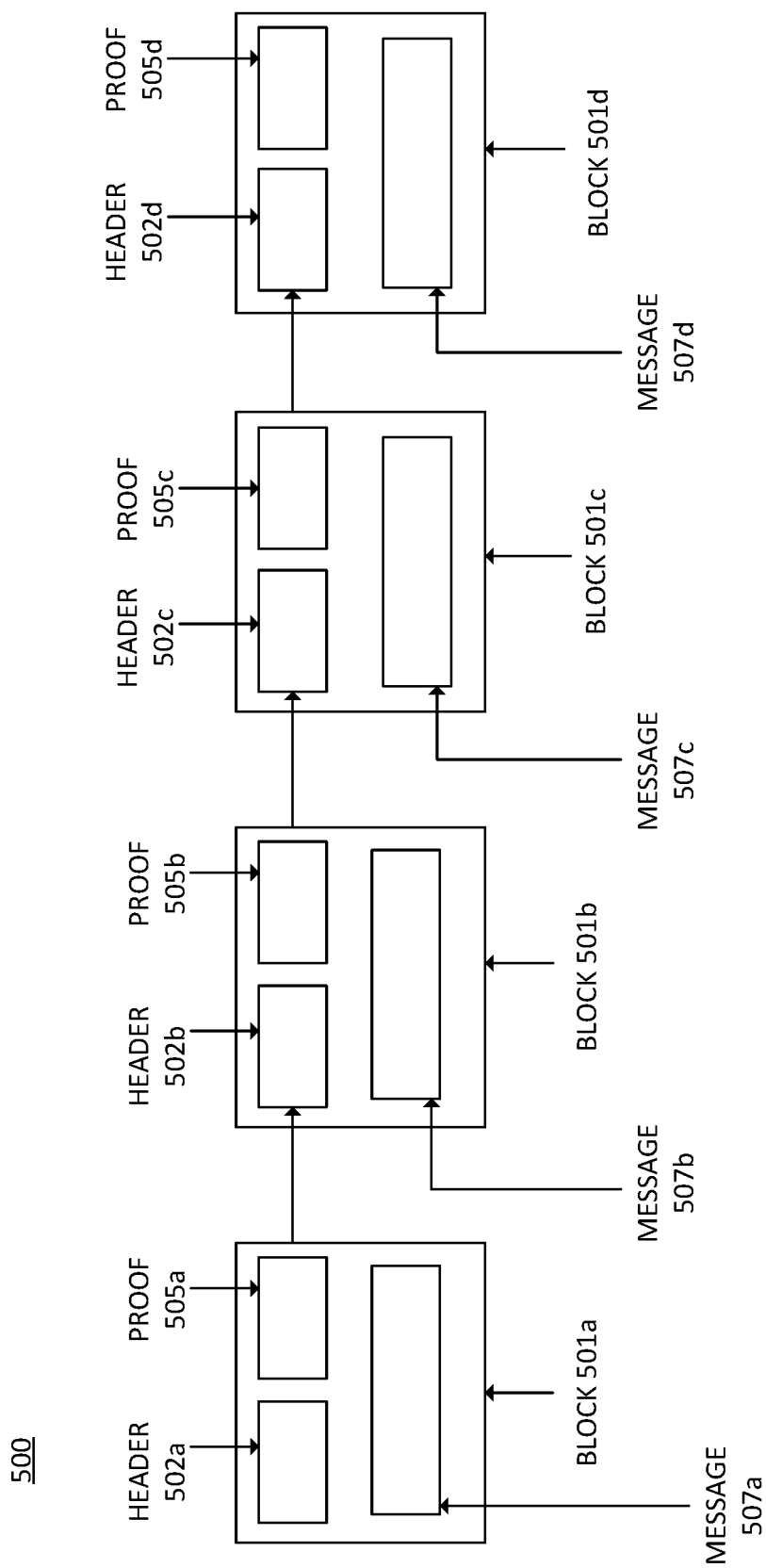
FIG. 5 depicts a logical model of an exemplary blockchain, consistent with disclosed examples.

It may be helpful to provide some details of a blockchain, such as that described with respect to the examples of FIGS. 1-4. FIG. 5 depicts a logical model of an exemplary blockchain 105, consistent with disclosed examples. In the example of FIG. 1, the blockchain 105 may include many such blockchains maintained by many different systems (e.g., user computing devices 101A-C and 102, or other systems) and computing devices (such as 101A-C and 102). In the logical model 500, such exemplary blockchains may comprise data-storage blocks, such as blocks 501a-501d. Blocks of the blockchain may include transactions, such as messages 507a-507d. Generally, blocks in the blockchain may include a header, such as headers 502a-502d, and each header uniquely identifies each block. The headers 502a-502d may, for example, include a hash value generated by a hash function. As mentioned above, a hash function is any function that can be used to map input data of arbitrary size to a hash value of a fixed size. For example, a header may include at least one of the previous block's hash value, a hash value generated based on any transactions in the block (e.g., a Merkle root), and a timestamp. Consistent with disclosed examples, system 500 may require that blocks added to blockchain 105 in the example of FIG. 1 satisfy at least one of a proof-of-work condition and an electronic signature condition. For example, the headers 502a-502d may include a nonce chosen to ensure the header satisfies the proof-of-work condition, such as 505a-505d. As a non-limiting example, the proof-of-work condition 505a-505d may require the hash of the header fall within a predetermined range of values. As an additional example, the header may be digitally signed with a cryptographic key of an authorized system, and the electronic signature may be included in the header. This electronic signature may be verified using a key available to the members of system 500.

Figure 6:
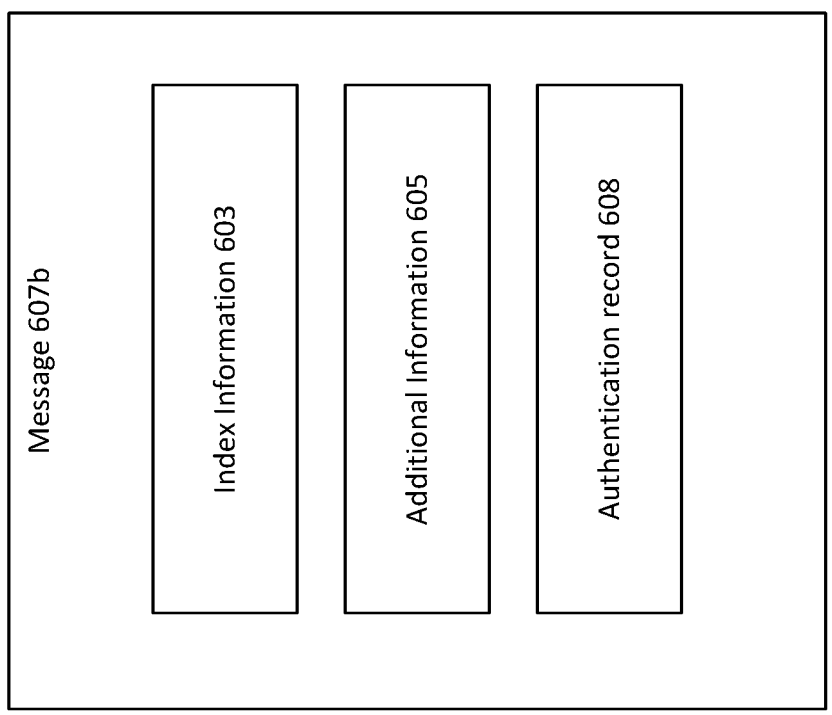
FIG. 6 depicts a logical model of a message stored in a blockchain, such as the blockchain element in FIG. 5, consistent with disclosed examples.

FIG. 6 depicts a logical model of a message 607b stored in a blockchain (e.g., an element of blockchain 105), consistent with disclosed examples. In some examples, message 607b may comprise index information 603. In certain examples, index information 603 may comprise information identifying a user. For example, index information 603 may be at least one of a full name, email address, phone number, or other non-sensitive personal information of the user. In various examples, index information 603 may include one or more references to earlier blocks in the private blockchain. For example, index information 603 may include one or more references to one or more earlier blocks associated with the same user. A reference may include, as a non-limiting example, a hash of a preceding block in the blockchain associated with the same user. In some examples, index information 603 may be obfuscated or encrypted according to methods known to one of skill in the art. For example, index information 603 may be encrypted with a cryptographic key. As an additional example, index information 603 may comprise a hash of at least one of a full name, email address, phone number, or other non-sensitive personal information of the user.

Message 607b may comprise additional information 605, consistent with disclosed examples. The amount of additional information is limited by the amount of data storage, or memory, available in the blockchain. If a block of the blockchain has more data storage or memory available, the amount of additional information that can be included in the message 607b includes greater amounts of information. Examples of additional information 605 include information related to a smart contract including attributes and settings, a document hash, an entire document, metadata consisting of timestamps which the document was signed, or Internet Protocol (IP) addresses of devices used to sign the documents, or the like. In various examples, additional information 605 may be obfuscated or encrypted according to methods known to one of skill in the art. For example, the additional information 605 may be encrypted with a cryptographic key.

Message 607b may comprise authentication record 608, consistent with disclosed examples. In some examples, authentication record 608 may comprise information enabling subsequent auditing of transactions. For example, authentication record 608 may identify at least one of user computing devices, such as 101A-C, a commercial institution associated with user computing devices, such as 101A-C, a purpose of the authentication request, a result of the authentication request, and information related to the authentication request. In some examples, a purpose of the authentication request may include the creation of a relationship (e.g., a financial relationship, such as a bank account, brokerage account, credit card account, and/or loan account) with a commercial institution associated with user computing device, such as 101A-C, or the performance of a service by user computing device, such as 101A-C (e.g., a financial server, such as performing transactions in a financial account associated with the user, cashing a check provided by the user, selling a cashier's check to the user, and/or debiting a user's account once or periodically to make payments on a loan). As would be appreciated by one of skill in the art, the above exemplary authentication purposes are not intended to be limiting. In some examples, a result of the authentication request may include whether the purpose of the authentication request was achieved. For example, when the purpose of the authentication request was the creation of a relationship, the result of the authentication request may indicate whether the relationship was created. As another example, when the purpose of the authentication request was the performance of a service, the result of the authentication request may indicate whether the service was performed. As would be appreciated by one of skill in the art, the above exemplary authentication results are not intended to be limiting. In some examples, information related to the authentication request may include additional contact information, demographic information, financial information, or similar personal information provided in connection with the authentication request. In some examples, such information may merely indicate that such information was provided, and/or provide a location where such information may be obtained. In some examples, authentication record 608 may be obfuscated or encrypted according to methods known to one of skill in the art. For example, authentication record 608 may be encrypted with a cryptographic key.

Cryptographic keys may be used to encrypt elements of transactions in blocks, consistent with disclosed examples. In some examples, such cryptographic keys may be associated with users of user computing device, such as 101A-C and 102 in FIG. 1. In various examples, at least some of the cryptographic keys may be associated with authorized systems. Corresponding cryptographic keys may be available to decrypt the encrypted message elements, consistent with disclosed examples. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some examples, the corresponding cryptographic keys may be available to users of user computing devices 101A-C and 102.

Figure 7:
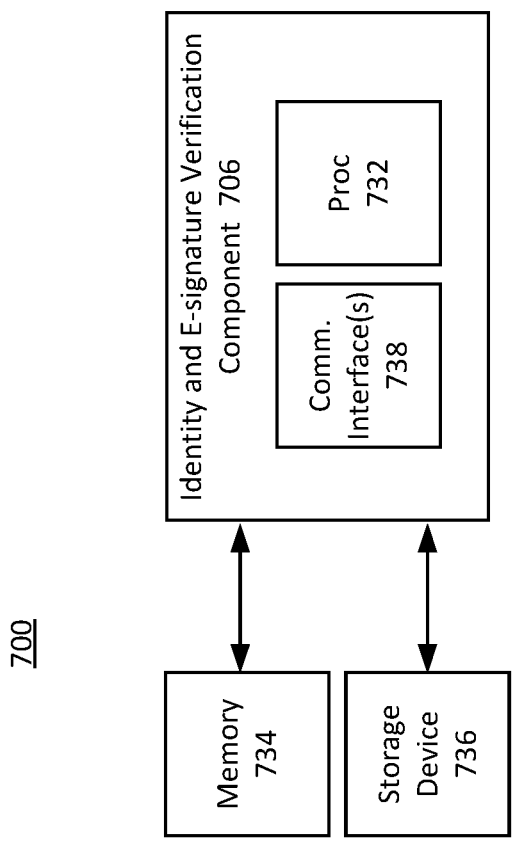
FIG. 7 illustrates an example of a hardware implementation of a component of the system example of FIG. 1.

FIG. 7 illustrates an example of a computing architecture suitable for implementing various examples as described in the examples of FIGS. 1-6.

The computing architecture 700 may include several components, such as the identity and electronic signature verification component 706, memory 734 and storage device 736. The identity and electronic signature verification component 706 may include several components that may perform one or more operations as discussed herein. The identity and electronic signature verification component 706 include one or more processor(s) 732, one or more communication (comm.) interface(s) 738 that may be coupled to a memory 734 and storage device 736 via, for example, one or more of the communication interfaces 738.

In examples, the identity and electronic signature verification component 706 may be a processing system that includes one or more servers or computing devices that are interconnected via one or more network links, e.g., wired, wireless, fiber, etc. In some instances, the transaction services system may be a distributed computing system. Each of the servers may include one or more processor(s) 732, which may include one or more processing cores to process information and data. Moreover, the one or more processors 732 can include one or more processing devices, such as a microprocessor manufactured by Intel™ AMD™, or any of various processors. The disclosed examples are not limited to any type of processor(s).

Memory 734 can include one or more memory (volatile or non-volatile) devices configured to store instructions used by the one or more processors 732 to perform one or more operations consistent with the disclosed examples. For example, memory 734 can be configured with one or more software instructions, such as programs that can perform one or more operations when executed by the one or more processors 732.

As mentioned, the identity and electronic signature verification component 706 includes one or more processors 732, memory 734, storage device 736, and interfaces 738. The identity and electronic signature verification component 706 may be a processing system that includes one or more servers or computing devices that are interconnected via one or more networking links, e.g., wired, wireless, fiber, etc. and is capable of processing information and data from the service provider data sources, activities and external data sources. In some instances, the identity and electronic signature verification component 706 may also be a distributed computing system. Each of the servers may include one or more processor(s) 732, which may include one or more processing cores to process information and data. Memory 734 can include one or more memory (volatile or non-volatile) devices configured to store instructions used by the one or more processors 732 to perform one or more operations consistent with the disclosed examples. For example, the memory 734 may store programming code and other computer-readable code that enables the identity and electronic signature verification component 706 to perform operations and functions as described with reference to the foregoing examples as well as other operations and functions, such as processing of information, generation of notifications and communicating with computing devices.

In examples, the identity and electronic signature verification component 706 may include one or more storage devices 736. The storage devices 736 may include hard disc drives (HDDs), flash memory devices, optical storage devices, floppy storage devices, or the like. In some instances, the storage devices 736 may include cloud-based storage devices that may be accessed via a network interface. In some examples, the storage device 736 may be configured to store one or more data structures and/or a distributed database system to store information and data.

The identity and electronic signature verification component 706 includes one or more interfaces 738. The one or more interfaces 738 can include one or more digital and/or analog communication devices that allow the identity and electronic signature verification component 706 communicate with other machines and devices, such servers and systems related to the services provided by the enterprise service providers. The one or more interfaces 738 may communicate via any type of connection, e.g., wired, wireless, optical, and so forth. These interfaces 738 may include network adapters and/or modems to communicate with the systems and/servers of the enterprise service providers. The examples are not limited in this manner.

Figure 8:
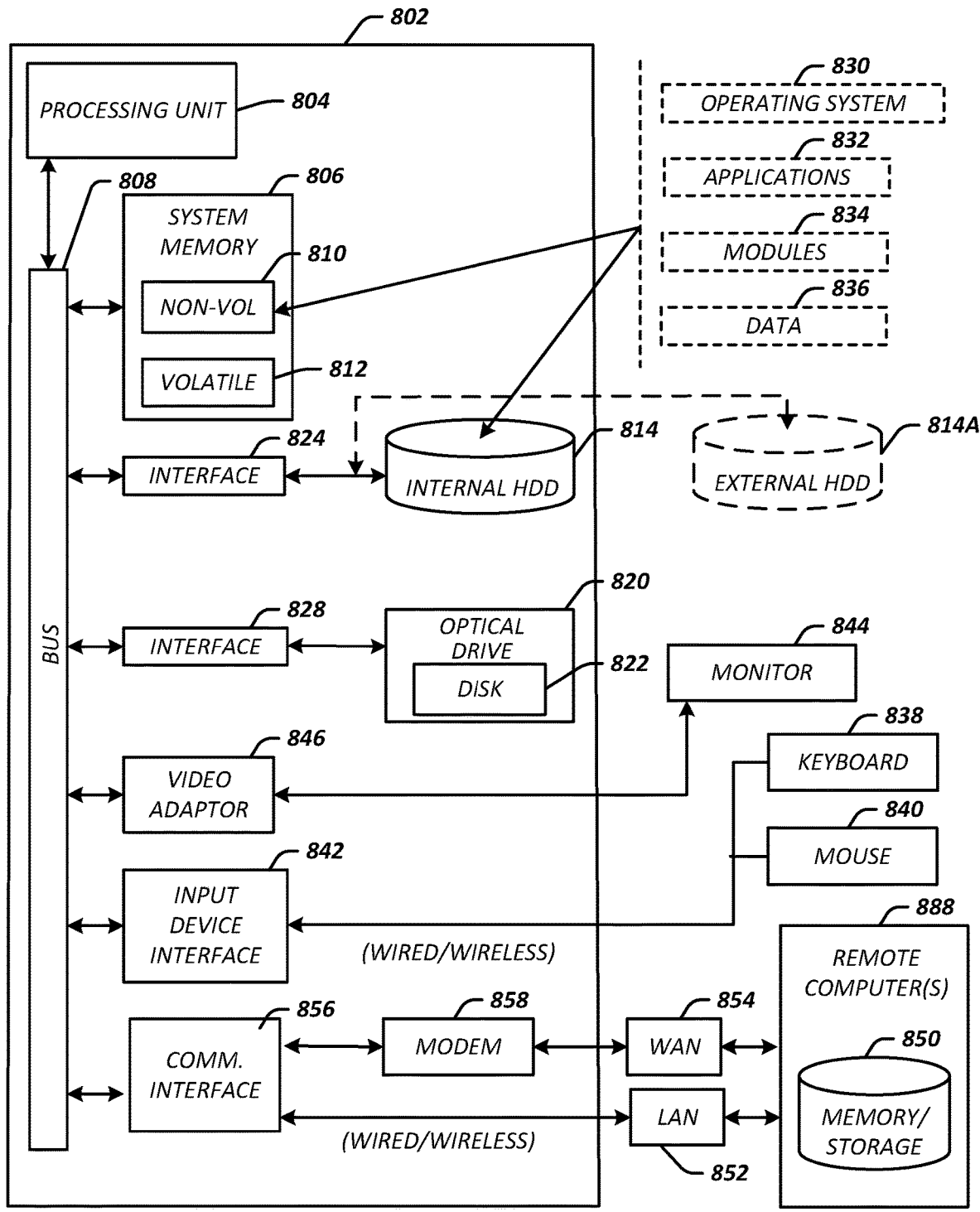
FIG. 8 illustrates an exemplary computing architecture suitable for implementing the devices, systems, and techniques described with respect to FIGS. 1-7.

FIG. 8 illustrates an embodiment of an exemplary computing architecture 800 suitable for implementing various embodiments as previously described. In one example, the computing architecture 800 may include or be implemented as part of networking environment 100. In another example, the computer architecture 800 includes components of an auto-recovery apparatus as well as other components that may optionally be part of the auto-recovery apparatus.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data transactions. Such data transactions may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors. The identity and e-signature verification system 140 of FIG. 1 may incorporate one or more of the components of the computer architecture 800, such as the processing unit 804, the system memory 806 and so on. Other components, such as the keyboard 838 and the mouse 840, may be omitted in some examples identity and e-signature verification system 140 of FIG. 1. The one or more of the components of the computer architecture 800 may be incorporated in the user computing devices 101A-C and 102.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a non-transient computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814 or external HDD 814A, and an optical disk drive 820 to read from or write to a removable optical disk 822 (e.g., a CD-ROM or DVD). The internal HDD 814 and optical disk drive 820 can be connected to the system bus 808 by an HDD interface 824 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, several program modules can be stored in the drives and memories 810, 812, including an operating system 830, one or more application programs 832, other program modules 834, and program data 836. In one embodiment, the one or more application programs 832, other program modules 834, and program data 836 can include, for example, the various applications and/or components of the system 800.

A user can enter commands and information into the computer 802 through one or more wired/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808 but can be connected by other interfaces such as a parallel port, IEEE 1394 serial port, a game port, a USB port, an IR interface, and so forth.

A display device 844 or another type of display device is also connected to the system bus 808 via an interface, such as a video adaptor 846. The display device 844 may be internal or external to the computer 802. In addition to display device 844, a computer typically includes other peripheral output devices, such as speakers, printers, and so forth.

The computer 802 may operate in a networked environment using logical connections via wire and/or wireless communications to one or more remote computers, such as a remote computer 888. The remote computer 888 can be a workstation, a server computer, a router, a personal computer, portable computer, microprocessor-based entertainment appliance, a peer device or other common network node, and typically includes many or all the elements described relative to the computer 802, although, for purposes of brevity, only a remote memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies and facilitate enterprise-wide computer networks, such as intranets, all of which may connect to a global communications network, for example, the Internet.

For example, identity and e-signature verification system implemented according to the example of FIG. 8 may authenticate the identity of one or more users related to transactions stored at an address in the blockchain. As explained through the description of the examples of FIGS. 1-6, the combination of using an electronic signature application provided by an enterprise and an identity and electronic signature verification system as provided by the enterprise provides a level of security and service from the enterprise that is presently unavailable. An instance of the electronic signature application may be stored in memory 812 or any one of the internal HDD 814 or external HDD 814A, usable to implement the hardware and process examples described with reference to FIGS. 1-6 above.

When used in a LAN networking environment, the computer 802 is connected to the LAN 852 through a communication interface 856 that may be either wired and/or wireless. The communication interface 856 can facilitate wired 250 and/or wireless communications to the LAN 852, which may also include a wireless access point disposed thereon for communicating with the wireless functionality of the communication interface 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

In some examples, the processing unit 804 of computer 802 may be operable to execute programming code stored in the system memory 806 or the internal HDD 814. The programming code may cause the processing unit 804 to perform functions as part of a process. An example of the process may include presenting a menu of smart contracts available from a menu of smart contracts on a display device 844. Each smart contract in the menu may include programming code associated with the smart contract. The smart contract programming code may be operable to control and monitor the smart contract attributes and settings as each authorized computing device accesses the smart contract. The processing unit 804 may further execute the programming code of the process to request the selected smart contract from the smart contract repository in response to a selection of a smart contract from the menu of smart contracts by a first user. In addition, the process may include the processing unit 804 receiving and storing the selected smart contract and the smart contract programming code in a memory. A document within the selected smart contract and an address of the smart contract in a blockchain may be generated. A document hash value from the generated document may be produced. The document hash value may be stored in a blockchain associated with the smart contract address in the blockchain. The generated document may be forwarded to a second user for review of the generated document. The document may be executed using a digital address associated with an identity of the first user. The first user digital address, for example, enables access to information confirming the identity of the first user. A hash function may be applied to a signed document or other parameter that generates a hash value referred to as an execution hash. An execution hash associated with the first user may be generated based on the execution of the document. The digital address associated with the identity of the first user, the document hash value and the execution hash may be stored in the blockchain associated with the smart contract address. A second user may receive the document for execution. A second user's execution hash indicating that the document was executed by a second user received from the second user. The second user's execution hash may be stored in the blockchain with the smart contract address. The smart contract may be marked as complete in the blockchain based on a contract complete value received from the smart contract. The contract complete value may be stored at an address associated with the document wallet in the blockchain.

The processing unit 804 may perform further functions of the process such as verifying the document is unaltered by confirming the document hash is unchanged upon receipt of the signed document hash from the second user. A record of transactions including document hash values associated with the document wallet stored in the blockchain may be retrieved. The processing unit 804 may apply a hash function to the document. After the hash function is applied, the resulting hash value may be compared to the signed document hash values in the blockchain network record. Based on the result of the comparison, the verification of the document as being unaltered may be confirmed, and in response to the confirmation, the smart contract may be marked as complete. In a further example, the processing unity 804 may receive confirmation from the smart contract (via the programming code of the smart contract) that the smart contract is completed and present the confirmation on a display device of a computing device associated with the first user.

In addition, the processing unit 804 upon execution of computer-readable program code may perform additional process steps such as selecting a contract attribute from a menu of contract attributes included with the presented menu for application to the smart contract prior to storing the selected smart contract and the smart contract programming code in a memory.

The menu of contract attributes may include attributes such as an order of signatures in the smart contract, a signing period date by which the smart contract must be ratified by all parties to the smart contract, a number of required signatures, a list entities or persons required to sign the contract, a contract expiration date, a delivery verification or the like.

The process executed by the processing unit 804 may include, prior to presenting a menu of smart contracts, receiving information uniquely identifying the first user, wherein the unique information enables verification of the first user as executing the generated document. The processing unit 804 may generate the first user digital address associated with the first user, wherein the digital address is unique to the first user. In addition, a request to verify an identity of the first user may be sent to a trusted independent system. The request may include the information uniquely identifying the first user and the address of the smart contract. The processing unit 804 may receive a confirmation that an endorsement token from the trusted independent system was received by the smart contract. The received confirmation may include an indication that the endorsement token was stored in the blockchain associated with the smart contract.

The various elements of the devices, apparatuses or systems as previously described with reference to FIGS. 1-3 and 5-8 may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

While the foregoing examples refer to contracts and the execution of documents, the above described examples may be useful in other areas, such as manufacturing, supply chain applications, auctions and online marketplaces, advertising and media sales, healthcare, and education, inventory management, Internet-of-Things/Smart device/Autonomous devices, banking and financial services, eCommerce, hospitality, law enforcement, government operations, insurance or the like.

What is claimed is:

1. A method, comprising:
   receiving, from an instance of an electronic signature computer application, a selection of a smart contract from a smart contract repository, wherein the selected smart contract includes a set of contract attributes and settings;
   in response to receiving the selection of the smart contract, delivering the selected smart contract to a smart contract address associated with the selected smart contract in a blockchain;
   generating a document based on attributes and settings of the selected smart contract;
   storing a document hash value of the generated document as a transaction in the blockchain, wherein the document hash value authenticates that the generated document was generated based on a smart contract selected by a first user verified as being associated with a first user's computing device;
   receiving a verification request for verification of ownership of a digital credential from the first user's computing device, the verification request including an identifier of the first user and a digital address associated with the first user;
   obtaining a hash value associated with the digital address associated with the first user from the blockchain;
   verifying, by using the obtained hash value and the identifier of the first user, an identity of the first user associated with the digital address as authentic;
   in response to the verification of the identity of the first user as authentic, generating an ownership endorsement token linked with the digital address associated to the first user;
   forwarding the ownership endorsement token for storage in the digital address associated with the first user in the blockchain, wherein the ownership endorsement token includes a respective hash value of the ownership endorsement token received from a trusted independent system.

2. The method of claim 1, further comprising:
   receiving the generated document further modified according to the attributes and the settings of the selected smart contract;
   receiving a document hash value of the modified document; and
   storing the document hash value of the modified document as a transaction in the blockchain, wherein the document hash value authenticates that the modified document was modified based on the selected smart contract and by a verified first user associated with a first user's computing device.

3. The method of claim 1, further comprising:
   receiving a generated document modified according to attributes and settings of the selected smart contract;
   identifying a final version of the modified document for electronic execution by the first user and a second user;
   generating a hash value of the identified final version of the modified document;
   maintaining the hash value of the identified final version of the modified document in the blockchain associated with the smart contract address; and
   forwarding the smart contract with the identified final version of the modified document to a computing device associated with the second user for electronic signature.

4. The method of claim 3, further comprising:
   sending in a transaction associated with a blockchain address of the verified first user to the blockchain, a first user copy of the hash value of the identified final version of the modified document; and
   sending in a transaction to a blockchain address associated with the second user, a second user copy of the hash value of the identified final version of the modified document.

5. The method of claim 1, further comprising:
   in response to a request from the electronic signature computer application code executing on the first user's computing device, opening the smart contract; and
   forwarding one or more indications of required signatures, signatures not yet received, a required review and review substantiation, an order of signatures, or an order of required signatures dictated by settings in the smart contract to the first user's computing device for use by the electronic signature computer application code operating on the first user's computing device.

6. The method of claim 1, further comprising:
receiving confirmation from the smart contract that the smart contract is completed; and
presenting the confirmation on a display of a computing device associated with the first user.

7. A system, comprising:
a memory storing programming code and electronic signature computer application code, wherein the programming code and the electronic signature computer application code are executable by a computing device;
a smart contract repository operable to store smart contracts, wherein each smart contract in the smart contract repository has contract attributes and settings; and
an electronic signature component coupled to the smart contract repository and the memory and to an external data network via a connection to an enterprise network, wherein the electronic signature component operates to:
receive, from an instance of an electronic signature computer application executing on a first user's computing device, a selection of a smart contract from the smart contract repository, wherein the selected smart contract includes a document and a set of contract attributes and settings;
in response to receiving the selection of the smart contract, deliver the selected smart contract to a smart contract address associated with the selected smart contract in a blockchain;
generate a document based on attributes and settings of the selected smart contract;
store a document hash as a transaction in the blockchain, wherein the document hash authenticates that the document was generated based on a smart contract selected by a first user verified as being associated with the first user's computing device;
receive a verification request for verification of ownership of a digital credential from the first user's computing device, the verification request including an identifier of the first user and a digital address associated with the first user;
obtain a hash value associated with the digital address associated with the first user from the blockchain via a connection to the external data network;
verify, using the obtained hash value and the identifier of the first user, an identity of the first user associated with the digital address as authentic;
in response to the verification of the identity of the first user as authentic, generate an ownership endorsement token linked with the digital address associated to the first user; and
forward the ownership endorsement token for storage in the digital address associated with the first user in the blockchain, wherein the ownership endorsement token includes a respective hash value of the ownership endorsement token received from a trusted independent system.

8. The system of claim 7, wherein the electronic signature component further operates to:
identify a final version of the document generated based on the attributes and the settings of the selected smart contract for electronic execution by the first user and a second user;
generate a hash value of the identified final version of the document; and
maintain the hash value of the identified final version of the smart contract in the blockchain associated with the smart contract address; and
forward the identified final version of the document with the smart contract address to the second user for electronic signature.

9. The system of claim 8, wherein the electronic signature component further operates to:
forward the identified final version of the document, select a contract attribute for application to the smart contract from a menu of contract attributes, wherein the menu of contract attribute includes:
an order of signatures in the smart contract, a signing period date by which the smart contract must be ratified by all parties to the smart contract, a number of required signatures, a list entities, and persons required to execute the smart contract, a contract expiration date, or a delivery verification.

10. The system of claim 8, wherein the electronic signature component further operates to:
maintain a first user copy of the hash value of the identified final version of the document in the blockchain associated with a blockchain address of the first user; and
maintain a second user copy of the hash value of the identified final version of the document in the blockchain associated with a blockchain address of the second user.

11. The system of claim 7, wherein the electronic signature component further operates to:
based on the attributes and the settings of the selected smart contract, forward one or more indications of required signatures, signatures not yet received, a required review and review substantiation, an order of signatures, or an order of required signatures dictated by the settings in the smart contract to the first user's computing device.

12. The system of claim 11, wherein the electronic signature component further operates to:
receive confirmation from the smart contract that the smart contract is completed; and
present the confirmation on a display of a computing device associated with the first user.

13. A non-transitory computer-readable storage medium storing computer-readable program code executable by a processor, the execution of the computer-readable program code causing the processor to:
present a menu of smart contracts available from a smart contract repository,
wherein each smart contract in the menu includes smart contract programming code;
in response to a selection of a smart contract from the menu of smart contracts by a first user, request the selected smart contract from the smart contract repository;
generate a document within the selected smart contract;
store a document hash value of the generated document in a blockchain as a transaction associated with an address of the smart contract;
receive information uniquely identifying the first user, wherein the uniquely identifying information enables verification of the first user as executing the generated document;
generate a first user digital address associated with the first user, wherein the first user digital address is unique to the first user;
send, to a trusted independent system, a request to verify an identity of the first user, the request including the information uniquely identifying the first user and the smart contract address;

store in the blockchain, a respective hash value of an ownership endorsement token received by the trusted independent system; and receive a confirmation that the ownership endorsement token from the trusted independent system was received by the smart contract, wherein the received confirmation includes an indication that the ownership endorsement token was stored in the blockchain associated with the smart contract.

14. The non-transitory computer-readable storage medium of claim 13, wherein the execution of the computer-readable program code causes the processor to:

forward the generated document to a second user for review of the generated document;

receive the document signed using a signature associated with an identity of the first user;

generate an execution hash value associated with the first user based on the document signed by the first user;

store the document hash value and the execution hash value in a transaction at the address in the blockchain associated with the smart contract address;

receive, from the second user, a second user's execution hash value indicating that the document was signed by the second user;

store the second user's execution hash in a transaction associated with the smart contract address of the selected smart contract in the blockchain;

mark the smart contract as complete in the blockchain based on a contract complete value received from the smart contract; and store the contract complete value in another transaction associated with the smart contract address of the selected smart contract in the blockchain.

15. The non-transitory computer-readable storage medium of claim 14, wherein the execution of the computer-readable program code causes the processor to:

upon receipt of a signed document hash value from the second user, verify the document is unaltered by confirming the signed document hash value is unchanged;

retrieve a record of transactions including a document hash value associated with the smart contract address of the selected smart contract in the blockchain;

apply a hash function to the document;

compare a resulting hash value to the signed document hash value in the blockchain;

based on a result of the comparison, confirm verification of the document as being unaltered; and in response to the confirmation, mark the smart contract as complete.

16. The non-transitory computer-readable storage medium of claim 13, wherein the execution of the computer-readable program code causes the processor to:

prior to storing the selected smart contract and the smart contract programming code in a memory, select a contract attribute for application to the smart contract from a menu of contract attributes included with the presented menu of smart contracts, wherein the menu of contract attributes includes:

an order of signatures in the smart contract, a signing period date by which the smart contract must be ratified by all parties to the smart contract, a number of required signatures, a list entities or persons required to execute the smart contract, a contract expiration date or a delivery verification.

17. The non-transitory computer-readable storage medium of claim 13, wherein the execution of the computer-readable program code causes the processor to:

receive confirmation from the smart contract that the smart contract is completed; and present the confirmation on a display of a computing device associated with the first user.

* * * * *